US011453035B2

(12) United States Patent
Cummings et al.

(10) Patent No.: US 11,453,035 B2
(45) Date of Patent: Sep. 27, 2022

(54) MEASURING AND CONVERTING FOOD WASTE

(71) Applicant: Bon Appetit Management Co., Palo Alto, CA (US)

(72) Inventors: Claire Elizabeth Cummings, Portland, OR (US); Margaret Mary Kraft, Alma, CO (US); David Goodfriend Kardon, San Francisco, CA (US); Maisie Lucia Ganzler, Santa Cruz, CA (US); Shaun Christopher Holtgreve, Scandia, MN (US)

(73) Assignee: Bon Appetit Management Co., Palo Alto, CA (US)

( * ) Notice: Subject to any disclaimer, the term of this patent is extended or adjusted under 35 U.S.C. 154(b) by 533 days.

(21) Appl. No.: 16/596,421

(22) Filed: Oct. 8, 2019

(65) Prior Publication Data
US 2020/0108428 A1 Apr. 9, 2020

Related U.S. Application Data

(60) Provisional application No. 62/743,242, filed on Oct. 9, 2018.

(51) Int. Cl.
*B09B 3/00* (2022.01)
*G01G 19/414* (2006.01)
(Continued)

(52) U.S. Cl.
CPC ............. *B09B 3/00* (2013.01); *G01G 19/414* (2013.01); *G01G 23/3735* (2013.01); *G01G 19/24* (2013.01); *G01G 19/4146* (2013.01)

(58) Field of Classification Search
CPC .... B09B 3/00; G01G 19/414; G01G 19/4146; G01G 23/3735; G01G 19/24
See application file for complete search history.

(56) References Cited

U.S. PATENT DOCUMENTS 4,840,239 A * 6/1989 Slagg ..................... G01G 19/24
177/25.14
4,911,256 A * 3/1990 Attikiouzel ........ G01G 19/4146
708/133
(Continued)

OTHER PUBLICATIONS

International Application No. PCT/US2019/055387, "International Search Report and Written Opinion", dated Dec. 10, 2019, 14 pages.

*Primary Examiner* — Randy W Gibson
(74) *Attorney, Agent, or Firm* — Kilpatrick Townsend & Stockton LLP

(57) ABSTRACT

A system for measuring and converting food waste is provided. The system includes multiple food waste monitoring devices and a food waste analysis device. These food waste monitoring devices are deployed at different geographical locations. Each of the food waste monitoring devices is configured for obtaining food waste data that includes a reason for waste, a destination of the food waste, and a category of food waste. The food waste data further includes an estimation of the weight of food waste generated by converting the volume of the food waste based on the nature of the food waste. The food waste data is transmitted to the food waste analysis device, which is configured to perform various analysis on the collected food waste data.

20 Claims, 13 Drawing Sheets

(51) Int. Cl.
*G01G 23/37* (2006.01)
*G01G 19/24* (2006.01)

(56) References Cited

U.S. PATENT DOCUMENTS

| | | |
|---|---|---|
| 7,415,375 B2 | 8/2008 | Shakman et al. |
| 2006/0015289 A1 | 1/2006 | Shakman et al. |
| 2011/0040660 A1 | 2/2011 | Allison et al. |
| 2014/0246255 A1* | 9/2014 | Semeniuta ............. G01G 19/40 |
| | | 177/25.14 |
| 2015/0168365 A1* | 6/2015 | Connor ................. G01N 33/02 |
| | | 356/402 |
| 2015/0294013 A1 | 10/2015 | Ozer |
| 2017/0069222 A1 | 3/2017 | Mekhsian et al. |
| 2019/0186986 A1* | 6/2019 | Hogea ................... G01G 23/36 |

* cited by examiner

MEASURING AND CONVERTING FOOD WASTE

CROSS REFERENCE TO RELATED APPLICATIONS

This patent application claims priority to U.S. Provisional Application No. 62/743,242, filed on Oct. 9, 2018, which is hereby incorporated in its entirety by this reference.

TECHNICAL FIELD

This disclosure relates generally to computers and digital data processing systems for facilitating measuring food waste in a large-scale system.

BACKGROUND

Tracking food waste in the food industry is a challenging task because the restaurants are scattered at different geographic locations and the food waste can include a large variety of food. Further, it is hard to accurately measure the quantity of food waste due to different natures of the food waste, different types of tools or measurement devices available at the different restaurants. In addition, kitchen employees are typically busy with normal business operations and do not have enough time and resources to accurately measure the quantity of different types of food wastes. It is thus desirable to have a food waste management system that can be used to collect food waste data with little effort from the kitchen employees, yet accurately and consistently across a large number of restaurants.

SUMMARY

Various aspects of the present disclosure provide a food waste management system. One example method includes generating and presenting a first user interface displaying an image for each of a set of container types, receiving a selection of a container type from the set of container types by receiving a selection from the first user interface, generating and presenting a second user interface displaying the image for the selected container type, receiving an indication of a fullness of a container in the selected container type by receiving an input from the second user interface, and modifying the image for the selected container type displayed in the second user interface based on the fullness of the container. The modified image is displayed in the second user interface to show the fullness of the container. The method further includes receiving data indicating nature of food waste and a count of containers of the selected container type that were used to collect the food waste, converting a volume of the food waste to a weight of the food waste based on a conversion factor selected based on the nature of the food waste. The volume of the food waste is determined based on the selected container type, the fullness of the container, the count of containers. The method further includes transmitting food waste data to a remote computing device, and the food waste data comprises the weight of the food waste.

One example system includes a plurality of food waste monitoring devices. Each food waste monitoring device of the plurality of food waste monitoring devices is configured for generating and presenting a first user interface displaying an image for each of a set of container types, receiving a selection of a container type from the set of container types by receiving a selection from the first user interface, generating and presenting a second user interface displaying the image for the selected container type, receiving an indication of a fullness of a container in the selected container type by receiving an input from the second user interface, and modifying the image for the selected container type displayed in the second user interface based on the fullness of the container. The modified image is displayed in the second user interface to show the fullness of the container. Each food waste monitoring device is further configured for receiving data indicating nature of food waste and a count of containers of the selected container type that were used to collect the food waste, converting a volume of the food waste to a weight of the food waste based on a conversion factor selected based on the nature of the food waste and transmitting food waste data to a food waste analysis device. The volume of the food waste is determined based on the selected container type, the fullness of the container, the count of containers, and the food waste data comprises the weight of the food waste. The system further includes the food waste analysis device configured to communicate with the plurality of food waste monitoring devices and further configured for filtering the food waste data received from the plurality of food waste monitoring devices based on analysis parameters. The analysis parameters comprise a data level selected from a hierarchy for calculating statistics of the food waste data. The food waste analysis device is further configured for calculating statistics for the filtered food waste data and presenting the statistics for the filtered food waste data in an analysis result user interface.

An example non-transitory computer-readable medium has program code stored thereon. The program code is executable by one or more processing devices for performing operations comprising generating and presenting a first user interface displaying an image for each of a set of container types, receiving a selection of a container type from the set of container types by receiving a selection from the first user interface, generating and presenting a second user interface displaying the image for the selected container type, receiving an indication of a fullness of a container in the selected container type by receiving an input from the second user interface, and modifying the image for the selected container type displayed in the second user interface based on the fullness of the container. The modified image is displayed in the second user interface to show the fullness of the container. The operations further include receiving data indicating nature of food waste and a count of containers of the selected container type that were used to collect the food waste, converting a volume of the food waste to a weight of the food waste based on a conversion factor selected based on the nature of the food waste, and transmitting food waste data to a remote computing device. The volume of the food waste is determined based on the selected container type, the fullness of the container, the count of containers. The food waste data comprises the weight of the food waste.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION

Systems and methods are provided herein for measuring food waste over different food service facilities. The system can include one or more food waste monitoring sites deployed over one or more food service facilities such as restaurants or cafeterias or microkitchens or offsite catering events. Each food waste monitoring site can be equipped with a food waste monitoring device configured to collect food waste data from food waste collectors. The food waste collectors can include kitchen employees, such as cooks, chefs, dishwashers, etc. or designated personnel for collecting food waste. Food waste collectors can use one or more food waste containers to collect food waste and input information about the food waste into the system through a user interface presented on the food waste monitoring device. For example, the food waste collectors can input the category of the waste, the nature of the food waste, the reason for the waste, the ways to dispose the waste, etc. In addition, the food waste collectors can input the quantity of the food waste by selecting the type of the containers used for collection, the number of the containers, the fullness of the containers and so on. The data collected at the food waste monitoring device can then to be sent to a food waste analysis device which is configured to perform analysis on the food waste data collected from various food waste monitoring sites. Such analysis results can then be presented to a user, such as a manager of a food service facility, upon request. Based on the analysis results, the user can make informed decisions regarding the management of food waste in the facility.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Figure 1:
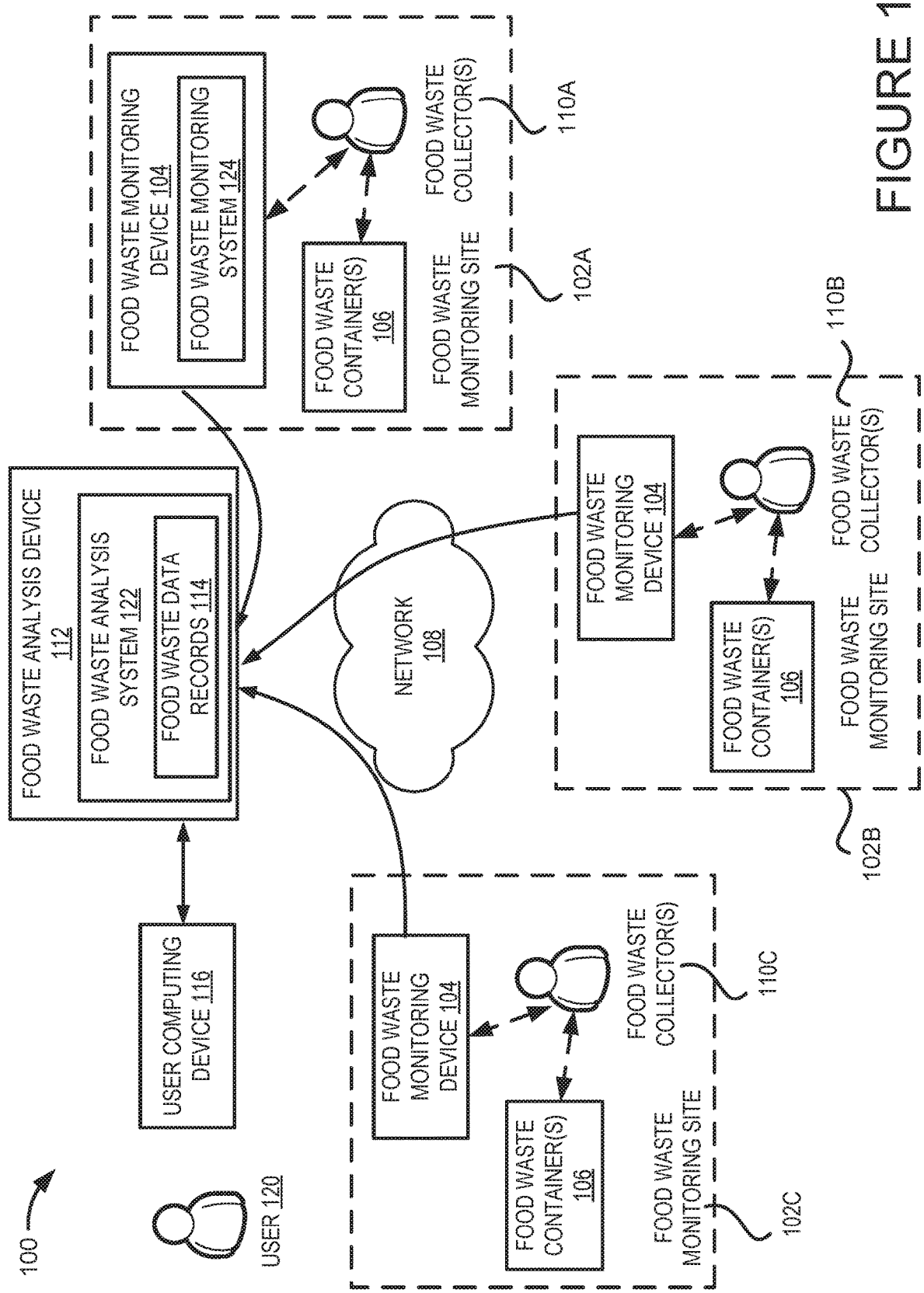
FIG. 1 is a block diagram depicting an example of the food waste management system, according to certain aspects of the present disclosure.

FIG. 1 is a block diagram depicting an example of the food waste management system 100. The food waste management system 100 can be deployed in one or more food service facilities, such as cafeterias across a university campus. As shown in FIG. 1, the system can include one or more food waste monitoring sites 102A-102C deployed at different geographical locations. The food waste monitoring sites 102A-102C may be referred to herein individually as a food waste monitoring site 102 or collectively as the food waste monitoring sites 102. Food waste collectors 110A-110C (which may be referred to herein individually as a food waste collector 110 or collectively as the food waste collectors 110) at each food waste monitoring site 102, such as employees in a cafeteria, can collect food waste and bring it to a food waste monitoring site 102. The food waste monitoring sites 102 can be set up so that the walking distance to the food waste monitoring site is minimized for the food waste collectors 110. For example, a food waste monitoring site 102 can be deployed in the center of a region where the food waste is to be collected. The food waste collectors 110 can use one or more physical containers and a variety of types of containers, collectively referred to herein as food waste containers 106, to collect the food waste. The food waste collectors 110 can further provide information about the food waste containers 106 and the food waste, such as the weight and/or volume of the waste, to a food waste monitoring system 124 installed on a food waste monitoring device 104 deployed at the respective food waste monitoring site 102. In some examples, the information about the food waste such as the weight or volume information is reported without using a scale or formal measuring tool. Additional details regarding the operations performed at the food waste monitoring sites 102 are provided below with regard to FIGS. 2-5.

Each of the food waste monitoring devices 104 can be linked or connected to a food waste analysis device 112 so that data collected at the food waste monitoring system 124 can be sent to a food waste analysis system 122 executed on the food waste analysis device 112 for further analysis. The food waste data can be sent to the food waste analysis system 122 upon submission by the food waste collectors 110. Alternatively or additionally, the food waste data can be sent to the food waste analysis system 122 on a regular basis, such as hourly or daily, or after a certain event is complete, e.g. at the end of a meal service. The food waste data is stored in the food waste monitoring device 104 until the food waste monitoring device is connected to the network 108 and transmitted to the food waste analysis system 122. The food waste monitoring device 104 can be a tablet, a smartphone, a laptop computer, or a desktop computer. The food waste monitoring system 124 can be a standalone application installed on the food waste monitoring device 104 or a web-based application accessible from the food waste monitoring device 104 through a web browser. The food waste monitoring devices 104 can be connected to the food waste analysis device 112 through a network 108, which might be a local-area network ("LAN"), a wide-area network ("WAN"), the Internet, or any type of data communications network known in the art that enables communications between the food waste monitoring device 104 and the food waste analysis device 112. The food waste analysis device 112 can store the collected data and the analysis results as the food waste data records 114 in a data storage device for future retrieval.

A user 120, such as a manager of the food service facility, can communicate with the food waste analysis device 112 through a user computing device 116, such as a laptop, a desktop, a tablet or a smartphone, to request the analysis results. Alternatively, or additionally, the user 120 can use the food waste analysis device 112 to view the analysis results. Upon request, the food waste analysis system 122 can generate the analysis results and present them to the user 120 through a user interface. Additional details regarding the request and presentation of the analysis results are provided below with regard to FIGS. 4A-4C and 6. It should be noted that while FIG. 1 describes the food waste analysis device 112 as a separate device from the food waste monitoring devices 104, one of the food waste monitoring devices 104 can be utilized to analyze data collected from the various food waste monitoring sites 102 thereby eliminating the need of using a separate food waste analysis device 112.

Figure 2:
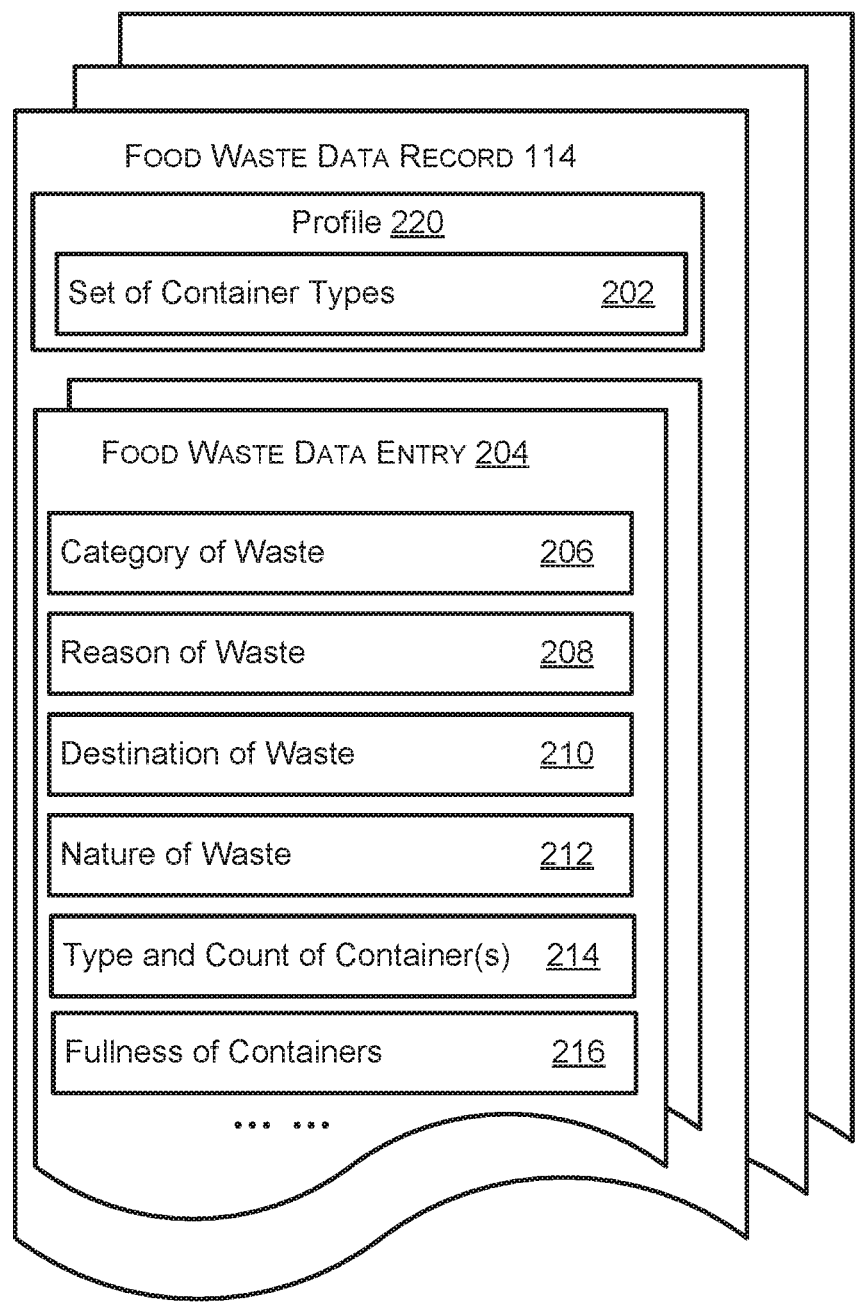
FIG. 2 is a diagram depicting an example of the data structure for storing food waste data records in a food waste analysis device, according to certain aspects of the present disclosure.

Referring now to FIG. 2, where an example data structure for storing food waste data records 114 in the food waste analysis device 112 is presented. A food waste data record 114 can be created for each food waste monitoring site 102, and each record 114 can include a profile 220 associated with the food waste monitoring site 102. The profile 220 may be set up by a user, such as a kitchen manager, to specify a specific combination of settings for a food waste monitoring site, such as the types of containers, the possible destinations of food waste, etc. In the example shown in FIG. 2, each profile 220 includes a set of container types 202 used to collect the food waste at the corresponding food waste monitoring site 102. The food waste monitoring system 100 allows different food waste monitoring sites 102 to use different types of containers. In some examples, the food waste management system 100 is configured to support a library of container types. The set of container types 202 may be selected from the library of container types. During the food waste monitoring operations, only the selected set of container types for the chosen waste profile will be displayed in the user interface. The food waste collectors 110 then only need to pick the container type that is currently used from the set of container types 202. This eliminates the need of using a scale to tare out the weight of a container and also reduces the time of inputting food waste data because the food waste collectors 110 only need to pick the container type from a small set of container types rather than going through the whole library of container types. The user interface can be updated by adding or deleting container types if the set of container types changes. A master user or another type of user of the food waste management system can edit the library of container types, such as adding or deleting container image and volume from the library, limiting the number of container types in the library, etc.

The food waste data record 114 can further include data for each food waste data entry 204. A food waste data entry 204 is generated whenever the food waste collectors 110 confirm and submit the food waste data. A food waste data entry 204 can include the category of the waste 206. The category of waste 206 can include avoidable waste and unavoidable waste. The avoidable waste can include waste that is generated by activities that occurred inside the kitchen, such as food storage or preparation, e.g., food that is accidentally made undesirable, such as over-salted, burned, improperly prepared, dropped, or spilled. The in-kitchen avoidable food waste can also include foods that are made in excessive amounts resulting in leftovers. The in-kitchen avoidable food waste can further include food that is unsafe to serve or donate, including expired food or food subjected to unsafe conditions (e.g. subjected to temperatures outside a safe range of temperatures for more than an allowed amount of time), or food that is of poor quality, such as spoiled foods, stale foods, bruised foods or wilted foods. In addition, the in-kitchen avoidable food waste can also include odd cuts, such as bread butts and crust or odd cuts of deli meat, etc. The avoidable food waste can also include waste that occurred outside the kitchen, such as catering leftovers, and food left on plates or thrown away by guests. The unavoidable food waste can include waste, such as trim waste and inedible portions of food items. This can include, for example, rinds, stems, trim, peels of fruits and vegetables, raw meat trim, stock bones, bones, shells, coffee grounds, and tea bags. Some food waste monitoring sites 102 may use dedicated containers to assist the food waste collectors 110 to correctly sort the waste. Avoidable food waste may be placed in a container dedicated to the avoidable food waste, whereas unavoidable food waste may be placed in another container dedicated to unavoidable food waste. It should be noted that different types of avoidable food waste can be mixed and placed in the container for avoidable food waste. Similarly, different types of avoidable food waste can be mixed and placed in the container for unavoidable food waste. In some examples, the container dedicated to the avoidable food waste or the container dedicated to the unavoidable food waste may be any container that is available and already in use at the food waste monitoring site 102 and labelled in a certain way to distinguish these two types of containers. Other ways of sorting waste are also possible and may be based on factors in addition to, or other than, the category of waste.

One benefit of the food waste monitoring device is that it accommodates waste in pots, pans, or other service ware already in use. The food waste collectors are not required to sort food waste or use dedicated containers for the food waste.

The food waste data entry 204 can also include a reason for the waste 208. For example, the reasons for discarding the food can include: the quality of the food is poor; the food was improperly prepared; the amount of food prepared or purchased was excessive; the food is an odd cut or end; the food is unsafe to consume, and so on. The food waste data entry 204 can further include a destination of the food waste 210, i.e. how the food waste is to be disposed. The destination of the food waste 210 may include destinations for feeding hungry people, for feeding animals, for use in industry, for composting, or for incineration or disposing in landfill. According to some aspects of the system, the reason for the waste can limit the choices for the destination of the waste. For example, the system may not present an option for donating food to feed hungry people when the food is unsafe to consume.

The choice of the destination of the waste can also be limited based on other factors. For instance, if there is no composting program at the food waste monitoring site 102, it is meaningless to allow food waste collectors 110 to select composting as a possible destination. In that case, the system may remove, disable or hide the option of composing when presenting the destination for the waste. This increases the accuracy of the input and decreases the time spent by the food waste collector 110 on the system because food waste collectors 110 only need to choose from the particular destinations that are applicable for the particular food waste monitoring site. In another example, the possible destinations of the waste are determined based on the profile 220 associated with the food waste monitoring site 102. As discussed above, the profile 220 may be setup by a user to include the possible destinations of food waste for the food waste monitoring site. In this way, food waste collectors 110 are only shown the destinations contained in the profile 220 and thus only need to choose from the particular destinations that are applicable for the particular food waste monitoring site for the particular waste profile chosen.

Further, the food waste data entry 204 can include the nature of the waste 212, the type and the count of the food waste containers 214, and the fullness of the container 216. This information can be utilized to estimate the quantity of food waste. The nature of the food waste 212 can include liquid food waste, wet food waste, dry food waste or mixed wet and dry food waste. The type of container can be selected from the set of the containers mentioned above. The fullness of the container 216 can indicate the percentage of the space occupied by food waste in the container compared with the full capacity of the container. For example, if the food waste only occupies half of the container, then the fullness of the container can be set to be 50%. Based on the fullness of the container, the type of the container and the nature of the food waste, the quantity or the amount of the food waste is calculated by the system. The quantity or the amount of the food waste includes the weight of the food waste and/or the volume of the food waste.

It should be understood that the data records shown in FIG. 2 are for illustration purposes only and should not be construed as limiting. The food waste data record may include more data items or fewer data items than what is shown in FIG. 2. For example, the food waste data record can further include, and thus food waste collectors 110 can be asked to further input, more detailed information about the food waste. These details can include, for example, the serving station associated with the food waste, e.g. a salad bar or a grill, the menu items associated with the food waste, or other details, such as the type of foods, e.g., bagels or cinnamon rolls. The food waste data record 114 can further include the estimated weight of the food waste based on the type and number of containers, the fullness of the containers, and the nature of the waste.

In another example, when an entire package of food becomes waste, the food waste collector 110 can enter an exact quantity of the food waste using the weight or volume indicated on or by the package. If an exact weight (such as ounces) is entered, then the system automatically converts the quantity to be reported in pounds. If an exact volume is entered, then the system uses that volume and the type of waste (dry, mixed wet and dry, wet, or liquid) to estimate the weight of the waste in pounds. Additional details on converting the exact quantity of food waste to be in weight are provided below with regard to FIG. 3A-3H. In this case, the data used to estimate the food waste, such as the type and count of the containers, and the fullness of the containers, may not be included in the food waste data entry 204.

Figure 3B:
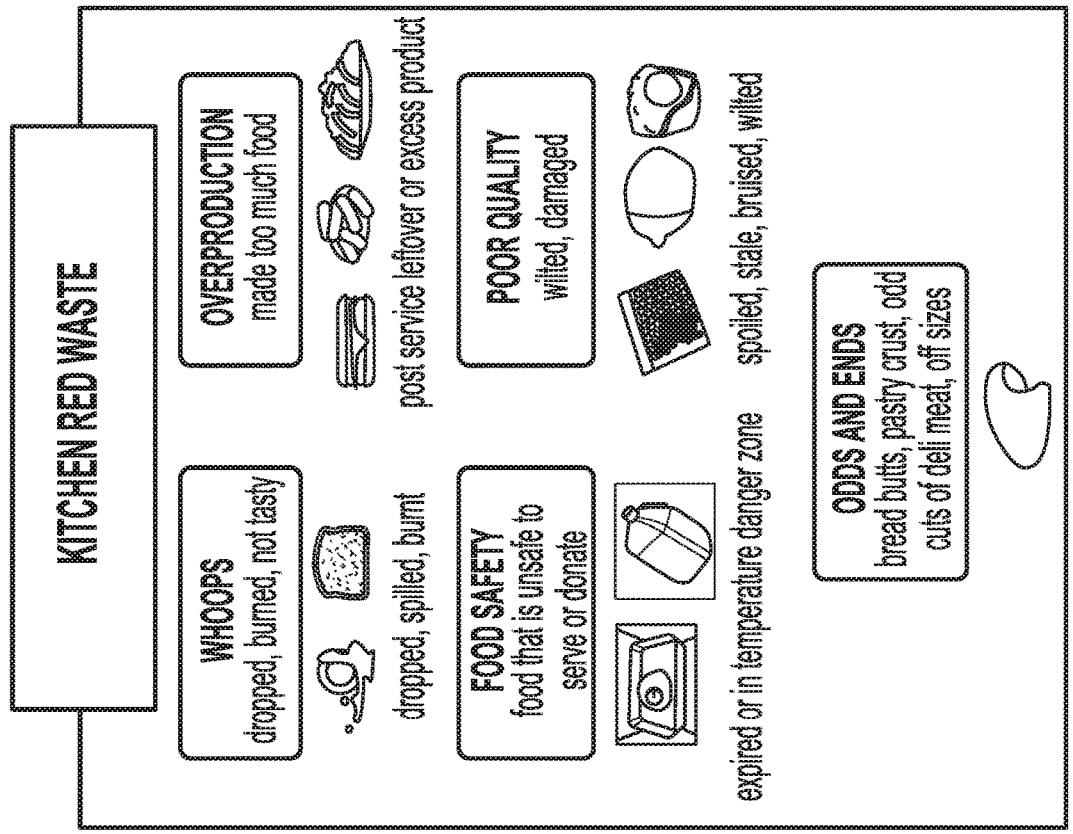
FIGS. 3A-3H are graphical diagrams illustrating example user interfaces that can be utilized to collect data from the food waste collectors for measuring the quantity of the food waste at a food waste monitoring site, according to certain aspects of the present disclosure.
Figure 3A:
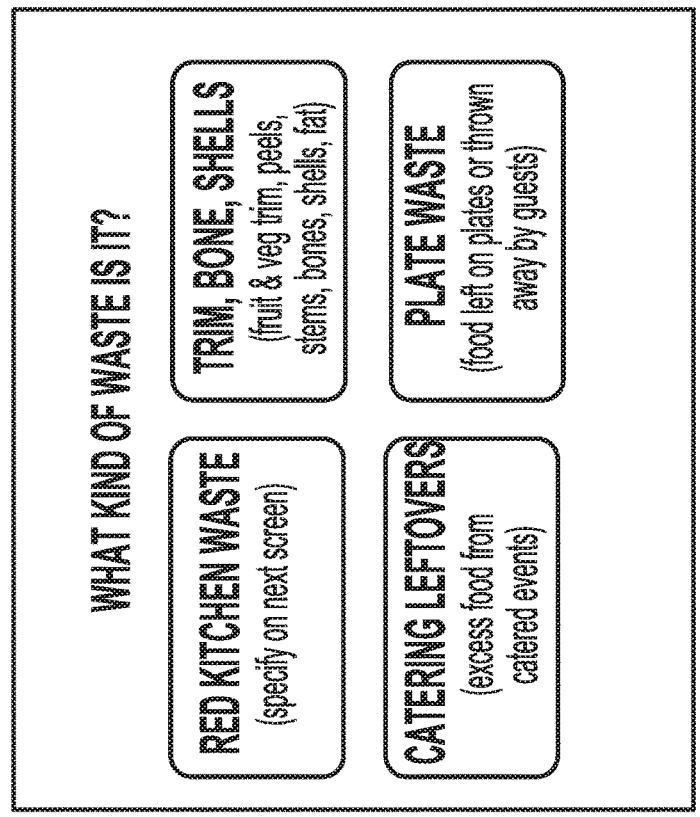

FIGS. 3A-3H illustrate example user interfaces that can be presented to food waste collectors 110 for collecting the food waste data in the food waste monitoring system 100. Specifically, the food waste monitoring device 104 can present a user interface such as that shown in FIG. 3A to prompt a food waste collector 110 to enter the category of the food waste collected. The user interface shown in FIG. 3A includes a user interface control, such as a button, for each category of food waste. The food waste collector 110 can input the food waste category by selecting the proper user interface control. For some categories of food waste, such as in-kitchen food waste, additional user interfaces can be presented to prompt the food waste collector 110 to enter more information. For example, a user interface shown in FIG. 3B can be presented to request the food waste collector 110 to enter more information about the avoidable in-kitchen food waste. The user interface shown in FIG. 3B can present a user interface control for each type of avoidable in-kitchen food waste. In addition, the user interface in FIG. 3B shows pictures of food waste for the corresponding type of food waste to facilitate the food waste collector 110 making the right selection. The food waste collector 110 can select the proper food waste type by pressing or clicking on the corresponding user interface control. Alternatively, or additionally, the content shown in FIG. 3B may be printed out on a poster and placed at the food waste monitoring site (such as near the food waste monitoring device 104) to facilitate the food waste collector 110 to enter the correct information to the food waste monitoring system 124.

Figure 3C:
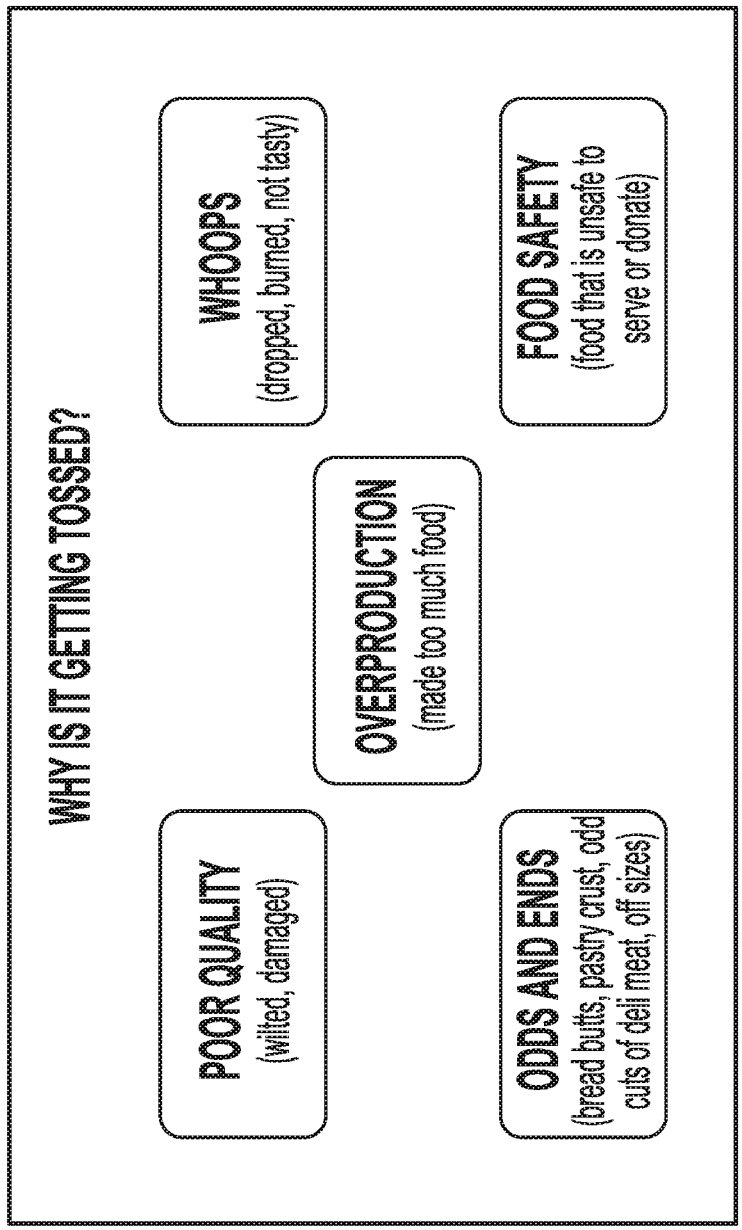

FIG. 3C illustrates a user interface for prompting the food waste collector 110 to input the reason for the food waste. Similar to the user interfaces shown in FIGS. 3A and 3B, the user interface shown in FIG. 3C presents multiple user interface controls each corresponding to a reason for the waste. Different languages and/or pictures can be used to explain the reasons of waste associated with each user interface control. The food waste collector 110 can input the reason for waste by selecting the proper user interface control. FIG. 3D illustrates a user interface for prompting the food waste collector 110 to input the destination of the food waste. In FIG. 3D, a pyramid of an adapted version of the Food Recovery Hierarchy graphic provided by the United States Environmental Protection Agency ("EPA") is shown. The pyramid has multiple layers representing different ways of disposing food waste. The food waste collector 110 can simply select the layer that corresponds to the specific way that the current food waste is to be disposed. In addition to allowing the food waste collector 110 to specify the destination of the food waste, showing the pyramid in the user interface also educates users of the system about the importance of prioritizing certain disposal methods over others.

Figure 3E:
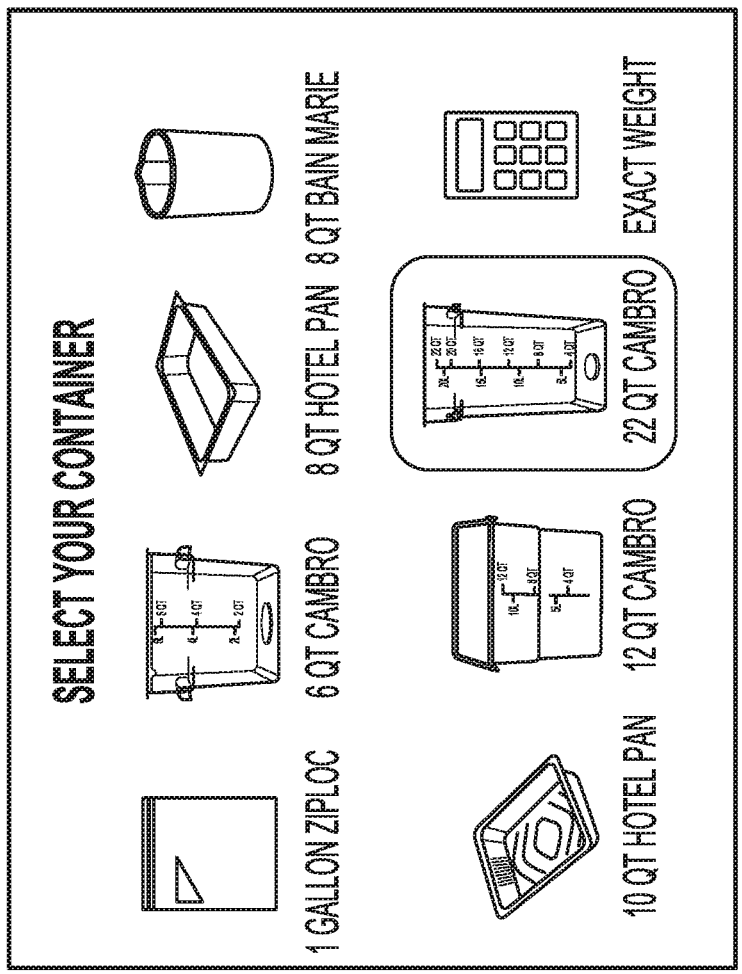
Figure 3D:
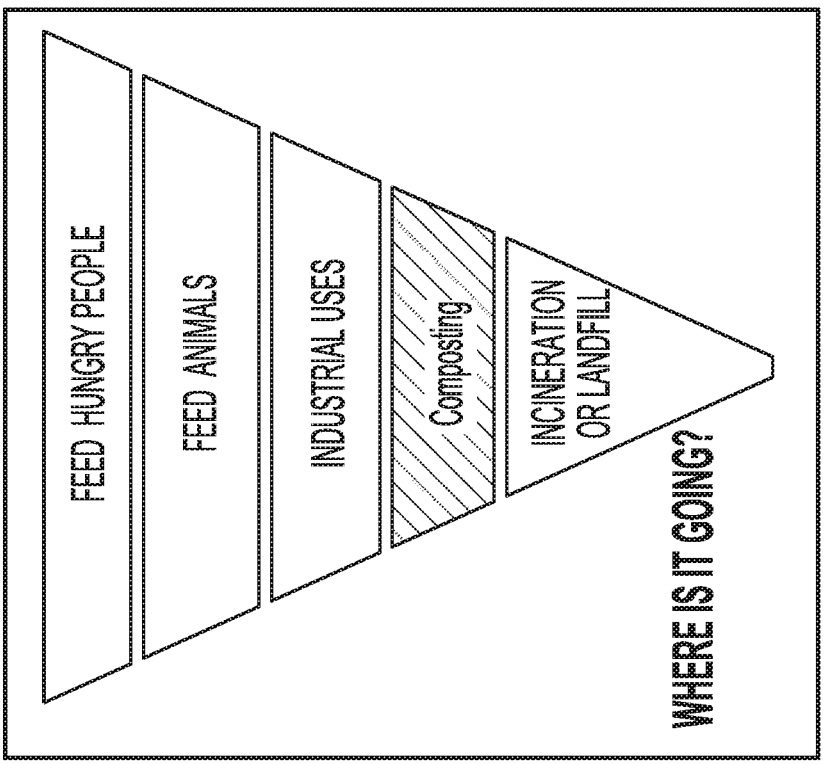
Figure 3G:
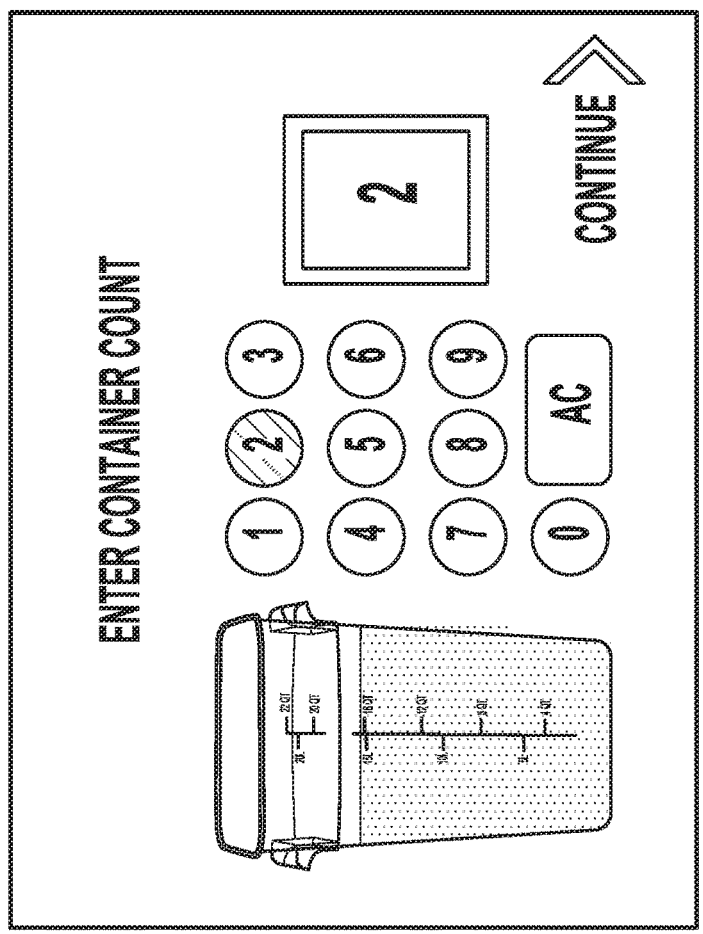

FIGS. 3E-3H illustrate example user interfaces that can be utilized to collect data from the food waste collectors 110 for estimating the quantity of the food waste. Specifically, FIG. 3E illustrates a user interface prompting the food waste collector 110 to enter the type of container used in collecting the current food waste. As discussed above, the food waste collector 110 or other personnel at the food waste monitoring site 102 can select a set of container types, from a library of food container types, used in that food waste monitoring site 102 for collecting the food waste. The user interface can retrieve the set of container types and present them in a form that the food waste collector 110 can easily recognize the container types included therein. For example, the container types presented in the user interface shown in FIG. 3E can include an image of a container for each container type and text description of the name and capacity of the container. The food waste collector 110 can input the type of container used during the collection by pressing a corresponding user interface control. Considering that food waste collectors 110 typically use the same type of containers for food waste collection, or use the same type of containers for a certain category of waste, the user interface can be presented by pre-selecting the type of container that is most often used at that specific food waste monitoring site 102 and/or for the specific category of waste. Alternatively, or additionally, a user of the food waste monitoring system 124 can change the settings in the profile 220 to change the set of container types 202 to include the most frequently used containers. As a result, the types of containers presented in the user interface will be the set of container types 202 specified in the profile 220.

Figure 3F:
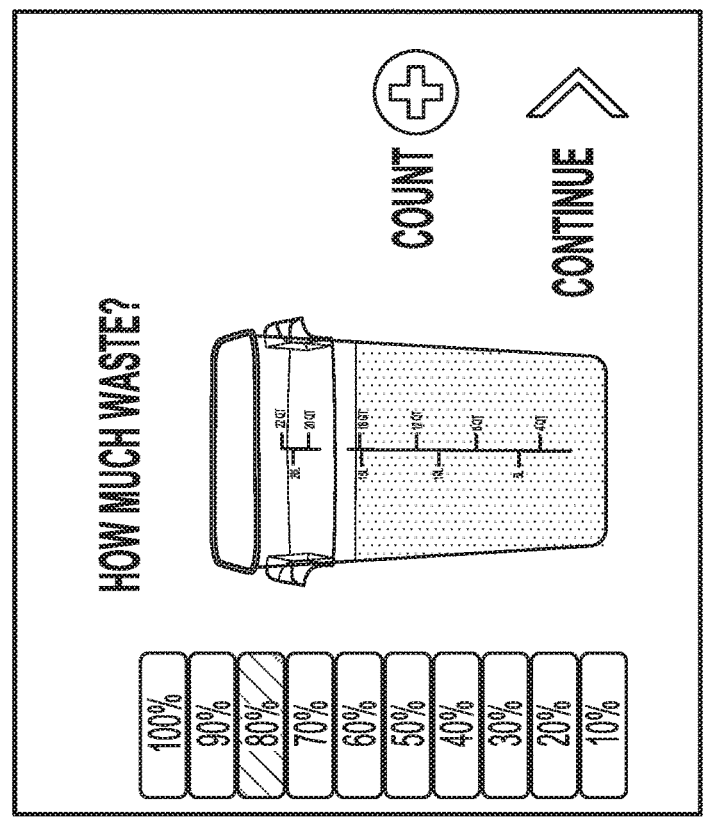
Figure 3H:
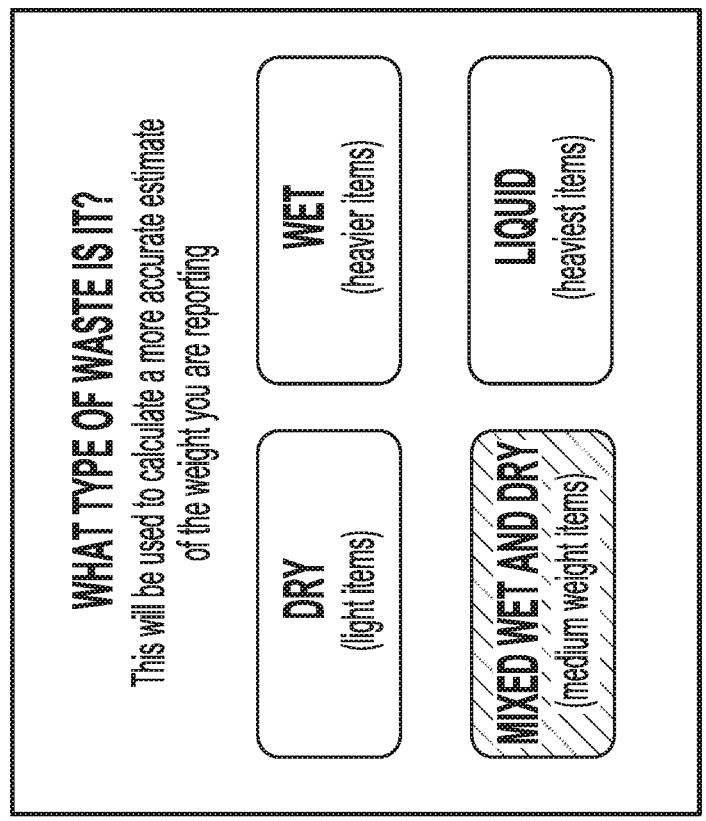

The food waste collector 110 can be further prompted for the fullness of the container, for example, through the user interface presented in FIG. 3F. The user interface may allow the food waste collector 110 to select a fullness level from a list of different percentages or drag a bar to indicate the fullness level of the container. As the image of the container on the user interface can be modified dynamically to reflect the selected fullness level so visually a user can make sure they are selecting the correct amount. Because the containers might not have measuring marks, the food waste collector 110 can provide the fullness information by estimating the space occupied by the food waste in a container based on his or her observation. In some implementations, the default value of the number of containers is one. If more than one container is used, a user interface shown in FIG. 3G can be utilized to prompt the food waste collector 110 to enter the count of containers that have with the same amount of fullness. After the type, fullness and count of the container (if more than one container is used) are entered, the food waste collector 110 might be further asked to input the nature of the waste, for example, through the user interface shown in FIG. 3H. The food waste collector 110 can enter such information by selecting the corresponding user interface control in the user interface. The information collected so far would allow the food waste monitoring system 124 or the food waste analysis system 122 to estimate the weight of the food waste.

In one example, the weight of the food waste W can be estimated based on the container information as follows:

$$W=(F\times(C\times N_Q))\times N_C. \quad (1)$$

Here, F is the fullness of the container in percentage, such as 70%, $N_C$ is the count of the containers. Both F and $N_C$ are entered by the food waste collector 110. $N_Q$ is the capacity of the container measured in a capacity unit or volume unit, such as quarts. $N_Q$ can be determined based on the type of container used to hold the food waste. C is a conversion factor having a constant value determined based on the nature of the waste. For the four different natures of food waste shown in FIG. 3H, the conversion factor may take one of the four values $C_L$, $C_W$, $C_M$, and $C_D$. Here, $C_L$ is the conversion factor for liquid waste, $C_W$ is the conversion factor for wet waste, $C_M$ is the conversion factor for mixed wet and dry waste, and $C_D$ is the conversion factor for dry waste. The conversion factors for food waste of different natures may be the same or different. In some implementations, each of the conversion factors may be set to a value greater than 0 pound and less than 5 pounds.

As discussed above, sometimes the exact weight of the food waste is known. For example, if an entire container of food, such as a 50-pound bag of flour or a 5-pound bag of sugar becomes waste, then the food waste collector 110 can determine the weight from the packaging of the food and input the exact weight of the food waste, e.g. by selecting the corresponding user interface control in FIG. 3E, without going through the steps illustrated in FIGS. 3F-3G. In some examples, the weight of the food waste is converted to a weight in pounds. In further examples, the weight of the food waste is also converted to a volume of waste estimate. The following formula can be used for these conversions:

$$\text{For weight in Ounces: (Number of ounces/16)}$$
$$=\text{Weight in Pounds} \quad (2)$$

$$\text{For weight in Pounds: (Exact Weight)}/C=\text{Volume in Quarts} \quad (3)$$

Similarly, if the exact volume of the food waste is known, such as a gallon of milk becomes waste, the food waste collector 110 can determine the volume of the waste from the packaging of the food and input the volume of the food waste. The volume information can be used in conjunction with the nature of the waste to estimate the weight of the food waste. For instance, the weight of the food waste may be estimated based on the volume information using the following formula:

$$\text{For volume in Quarts: (Number of quarts)}\times$$
$$C=\text{Weight in Pounds} \quad (4)$$

$$\text{For volume in Gallons: (Number of gallons}\times 4)\times$$
$$C=\text{Weight in Pounds} \quad (5)$$

$$\text{For volume in Pints: (Number of pints/2)}\times C=\text{Weight in Pounds.} \quad (6)$$

In the above equations (Eqns. (2)-(6)), C is the conversion factor and the value of C is taken from $C_L$, $C_W$, $C_M$, and $C_D$ depending on the nature of the waste. It should be understood that the measurement data used for calculating the quantity of the food waste, including volume and weight, as well as the conversion factors can be in any system of measurement, including the metric system and the English system.

The estimated or exact quantity of the food waste along with other information input by the food waste collector 110 can be presented to the food waste collector 110 for confirmation prior to submission. The types of information requested or the specific categories of waste, reasons for waste, disposal options, types of containers may be configurable and may be different for different systems.

It should be understood that although the user interfaces are presented above in a certain order, these user interfaces can be presented in any order to collect food waste data from a food waste collector 110. For example, the user interface for collecting the type of waste shown in FIG. 3H can be presented to the food waste collector 110 before the information of the container is collected through the user interfaces shown in FIG. 3E-3G. The user interface for inputting the destination of the food waste may be presented after all other information is collected. Further, the user interfaces described herein might include more or fewer components, might be arranged differently, and might operate in a different fashion while still remaining within the scope of the disclosure provided herein. In addition, not all the user interfaces depicted in FIGS. 3A-3H are presented by the food waste monitoring system 124 and additional user interfaces may be used to collect the food waste data.

For example, the food waste monitoring system 124 may also present a settings page, where a food waste collector 110 can specify the various settings of the food waste monitoring system 124, including synchronizing the food waste monitoring device 104 with a particular campus, kitchen, or profile. The settings page can also be configured to allow a user to refresh the page to load updated settings from the food waste analysis system 122 so that a history of the uploaded food waste data can be viewed. In addition, the settings page can also be configured to present a campus/kitchen/profile list so that a food waste collector 110 or another user can choose to link the food waste monitoring system 124 to a specific food waste monitoring device 104.

In another example, a user interface, such as the home screen of the food waste monitoring system 124, can be presented where the food waste collector 110 can switch between profiles to track and report the food waste. The food waste monitoring system 124 can also generate a reminder and present the reminder on this or another user interface if the food waste monitoring device 104 has not been connected to the network longer than a certain threshold period of time. Various other user interfaces may be added to facilitate food waste management.

Figure 4A:
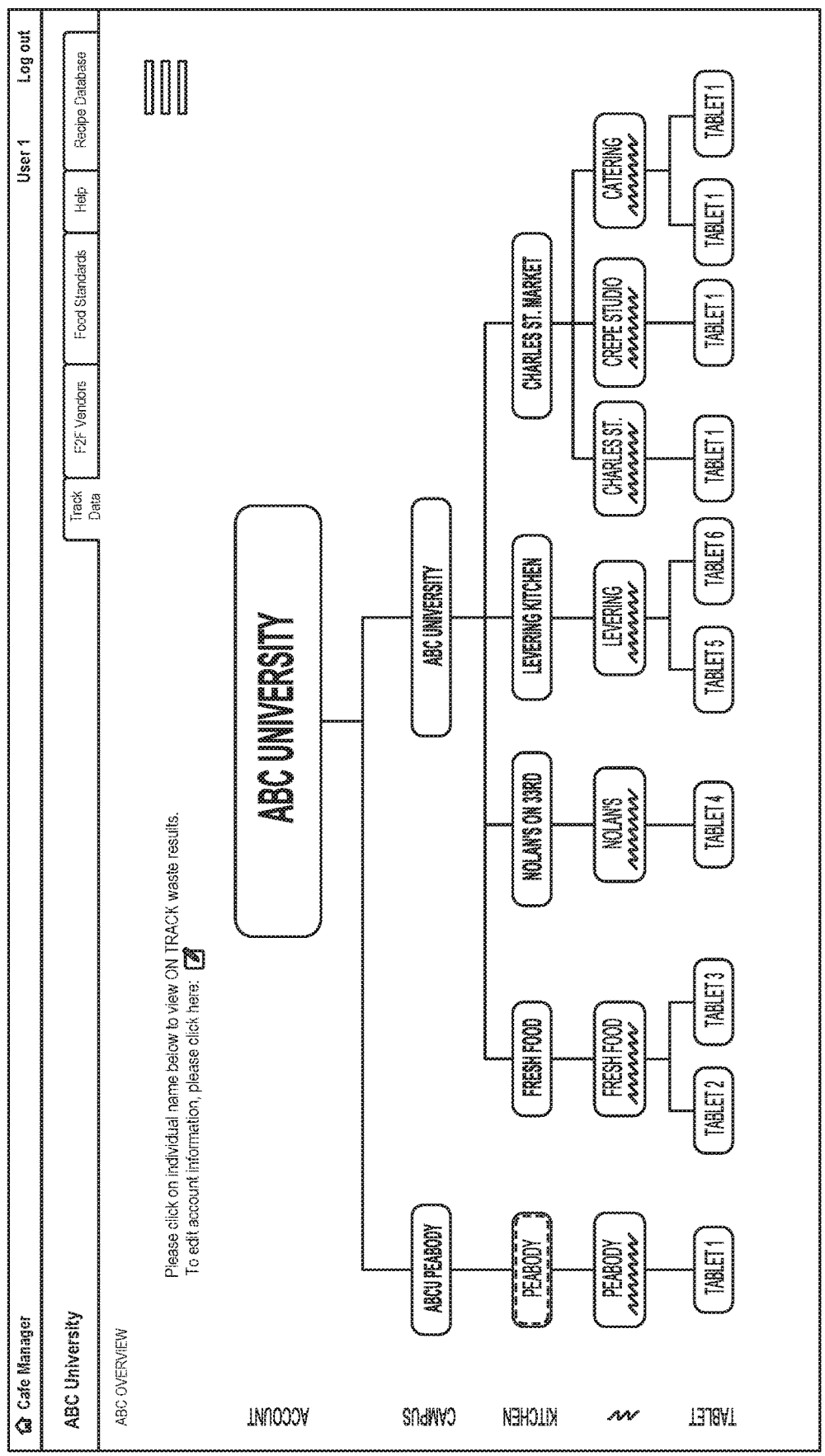
FIGS. 4A-4C are graphical diagrams illustrating example user interfaces for presenting the food waste analysis results, according to certain aspects of the present disclosure.
Figure 4B:
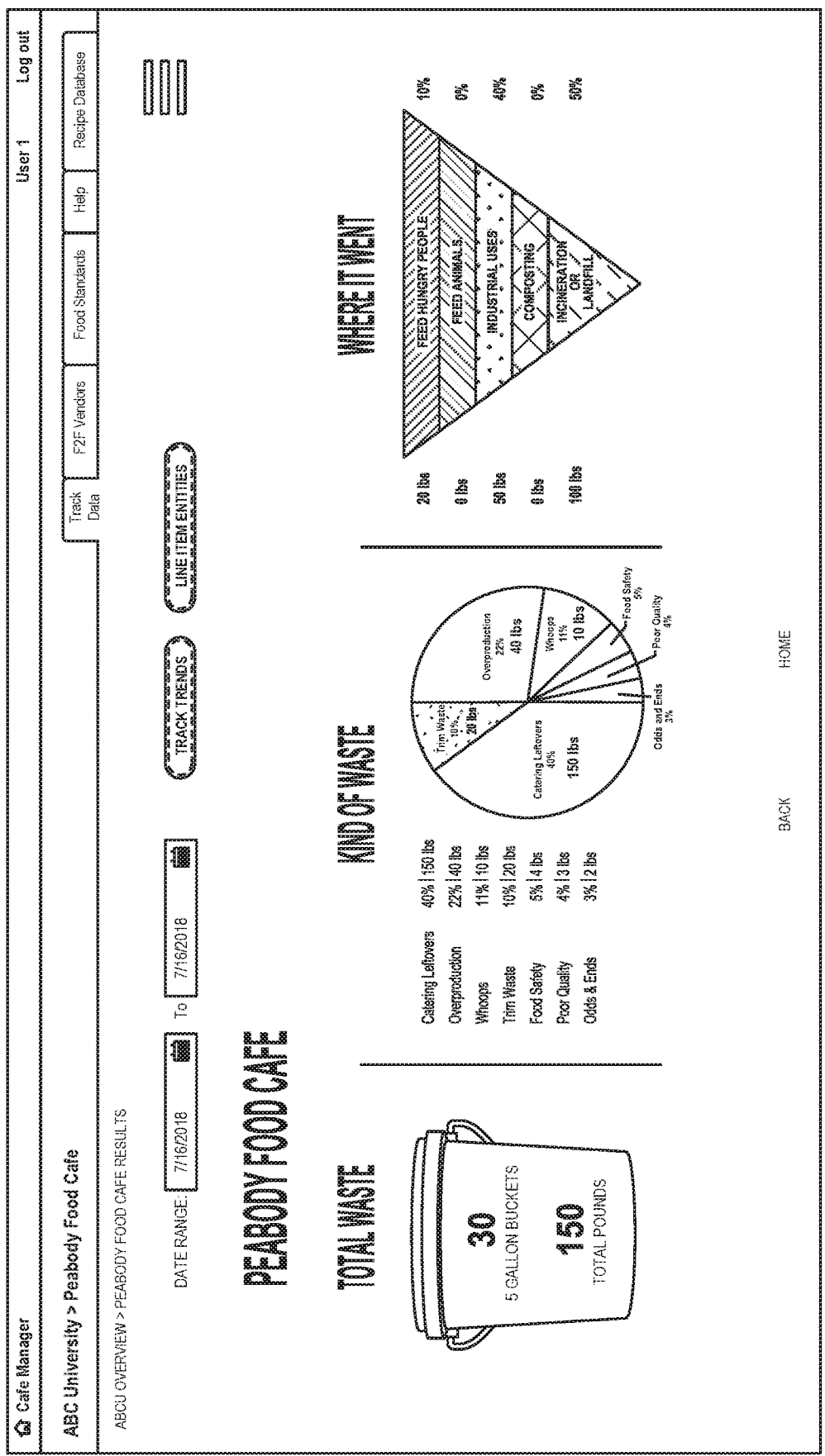
Figure 4C:
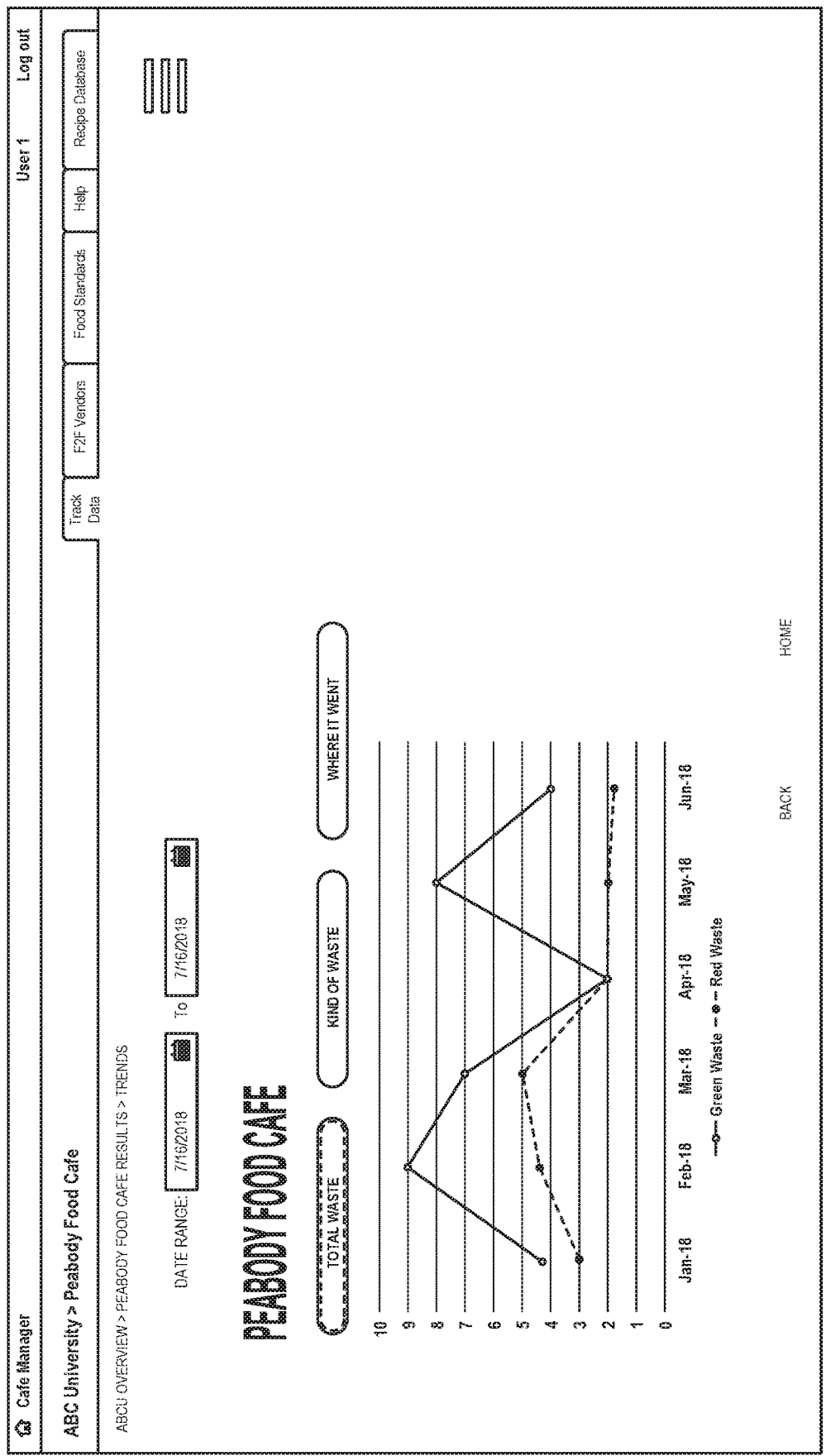

The collected food waste data can be sent to the food waste analysis system 122 for aggregation with the food waste data from other food waste monitoring sites 102 or with other data from the same site and for further analysis. The analysis results can be presented to a user 120, such as a manager of the food service facility for which the food waste monitoring system 100 is deployed. FIGS. 4A-4C illustrate example user interfaces where the food waste analysis results can be presented. Upon a user request, the food waste analysis system 122 can present on the food waste analysis device 112 or another computing device a diagram of the locations where the food waste monitoring sites 102 are deployed. For example, a university might include multiple food service locations distributed across multiple campuses. One or more food waste monitoring sites 102 might have been deployed in each of the food service locations and/or kitchens. A user interface, such as the one shown in FIG. 4A, can be presented to a user so that the user can select one or more food service locations for which the analysis results are to be displayed. Alternatively, or additionally, the food waste analysis system 122 may also allow the user 120 to select the food service locations for analysis by specifying a hierarchy level, such as region, account, campus, kitchen, profile, device, and so on.

Upon receiving the user selection, the food waste analysis system 122 can collect food waste data for all the food waste monitoring sites 102 belonging to the selected service location and perform the analysis. The user can also specify the view of the analysis results by specifying the level of data they are interested in, such as the region level, the account level, the campus level, the kitchen level, the profile level. For example, if a higher level is selected, such as the campus level, the user interface can show an entire campus layout, from the account to kitchen, to profile, to each food waste monitoring device 104. Under this view, data can be accessed and viewed at each level below the selected level. The system can automatically adjust the displayed results to show just the data from the selected level. The user interface can also be configured to allow a user to control various parameters of the display data, such as the start and end dates of the food waste data, the frequency of plot points to view the data, and others so that the data can be viewed in a variety of ways.

In a further example, the system can also be configured to incorporate and show a goal for each level along with the analysis data, such as the goal for a region, a district, a cost center, a profile, etc. In addition, the system can be configured to incorporate and show a cost-waste comparison view. In this view, a comparison of the cost of purchasing food for an event, such as a yearly commencement banquet or a yearly CEO meeting, and the food waste for that event can be displayed. Such comparisons can be performed for multiple past occurrences of these events, such as multiple years, months, etc. to track trends or correlate the cost of food and the amount of the waste.

The results can be presented in various formats in a user interface, such as in a pie chart, a line chart, or a bar chart. FIGS. 4B and 4C illustrate the user interfaces for presenting the analysis results. FIG. 4B shows an example of using various graphs to display information such as the number of buckets of food waste, where the waste went, what were the highest categories of waste, etc. The graphs can be adjusted to display any date range selected. FIG. 4C shows an example of a user interface which can be utilized by a user to build line graphs to track different variables, such as overproduction waste, or food donation, and to set different date ranges. The food waste analysis system 122 may also be configured to allow a user to export the food waste data records 114 and the analysis results by, for example downloading a file or a spreadsheet that contains a portion or all of the waste entries, showing the time, types of waste, the destination of the waste, etc.

The hierarchy of the data level can be stored at the food waste analysis device 112 or another computing device, and be loaded into the food waste analysis system 122 upon execution. In addition, existing businesses' corporate structure can also be integrated into the hierarchy of the food waste management system so that users can specify the level of analysis based on the existing structure of their organizations. Further, a user 120 or an administrator of the food waste management system 100 can add, delete or otherwise edit parts of the hierarchy. For example, a user can add kitchens, change their profile settings, as well as delete profiles and kitchens that do not have any data reported. For example, a user can name and select the number of profiles they want to use for tracking, and can link (or not link) cost centers in the existing hierarchy that are already associated with the account. The user can also turn on and off any of the features he or she wants for a profile so one can look different from another. A user can also name and select the number of kitchens for which he or she wants to perform the analysis and display the analysis results. Likewise, a user of the food waste analysis system 122 can also customize other aspects of the food waste management system 100, such as turning on and off certain features, or changing the categories of the waste being tracked, waste destinations, or waste containers.

Figure 5:
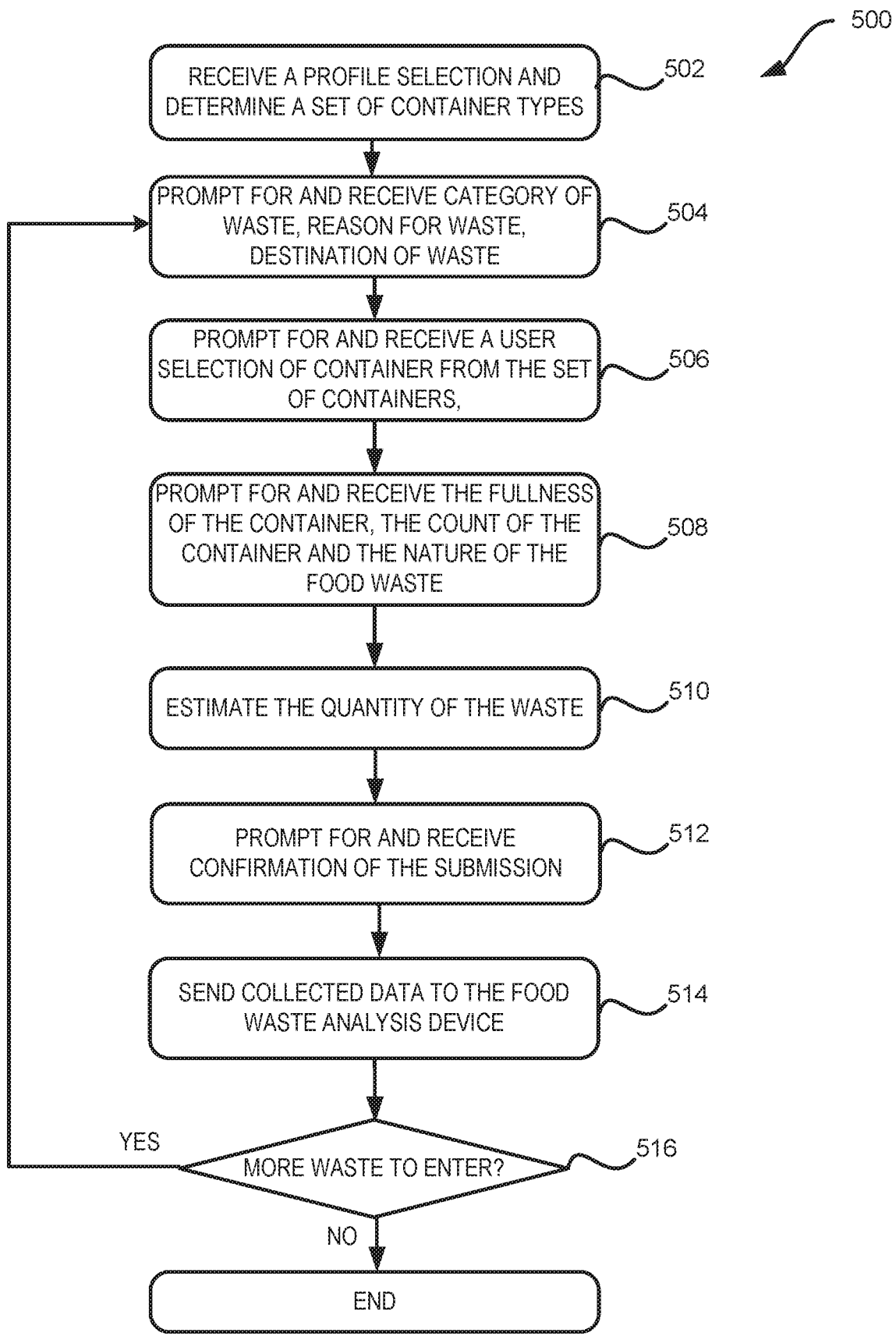
FIG. 5 is a flow diagram illustrating an example of a process for measuring food waste at a food waste monitoring site, according to certain aspects of the present disclosure.

FIG. 5 is a flow diagram illustrating an example of a process 500 for collecting food waste data at a food waste monitoring site 102. For illustrative purposes, the process 500 is described with reference to implementations described above with respect to one or more examples described herein. Other implementations, however, are possible. In some aspects, the steps in FIG. 5 may be implemented in program code that is executed by one or more computing devices such as the food waste monitoring device 104 depicted in FIG. 1. In some aspects of the present disclosure, one or more operations shown in FIG. 5 may be omitted or performed in a different order. Similarly, additional operations not shown in FIG. 5 may be performed.

At block 502, the process 500 involves receiving a profile selection performed by a user to select a profile 220 for the food waste monitoring device 104. Based on the selected profile 220, the system can determine the set of containers associated with the profile 220. In another example, the set of containers are explicitly selected by the user. In this example, before the food waste collection starts, the food waste monitoring system 100 allows the selection of a set of containers that are presented to a food waste collector 110 in the food waste monitoring system 124. After the food waste is collected, the food waste monitoring device 104 can present a series of user interfaces to prompt the food waste collector 110 to input various information associated with the collected food waste. For example, at block 504, the process 500 involves prompting for and receiving from the food waste collector 110, the category of the food waste, the reason for the waste, and the destination of the food waste.

In addition, the food waste monitoring device 104 can prompt for and receive information on the containers used in collecting the food waste. For example, at block 506, the process 500 involves prompting for and receiving a user selection of a container from the set of containers. The food waste monitoring system 124 can generate and present a corresponding user interface as discussed above with respect to FIGS. 3A-3H, and receive the user selection by receiving a selection or input from a corresponding user interface control. At block 508, the process 500 involves prompting for and receiving the type, the count, and the fullness of the container. Similarly, the food waste monitoring system 124 can generate and present proper user interfaces and receive the data by receiving selections or inputs from the corresponding user interface controls. In one implementation, the default value for the count of containers is one. The food waste monitoring system 124 receives or retrieves this default value as the count of containers unless the user changes this default value. If the users changes this default value, the food waste monitoring system 124 receives the count of containers from the corresponding user interface, such as the user interface shown in FIG. 3G. Once the information is gathered, the food waste monitoring system 124 can estimate the quantity of the current food waste collection at block 510. As discussed above in detail with regard to FIGS. 3A-3H, the estimation can be performed by applying one or more estimation formulas selected based on the nature of the food waste. At block 512, the process 500 involves presenting the collected data to the food waste collector 110 for confirmation. Upon receiving the confirmation, the food waste monitoring device 104 can send the food waste data to the food waste analysis device 112 at block 514. At block 516, the food waste monitoring system 124 determines that if there is more food waste to be recorded. If so, the process 500 can loop back to block 504 to collect data for the additional food waste. The process 500 ends when there is no more food waste to be recorded.

It should be understood that although in the example process 500, the estimation of the food waste is performed by the food waste monitoring system 124, the estimation can alternatively be performed by the food waste analysis system 122. For instance, the food waste monitoring system 124 can include, in the food waste data to be transmitted to the food waste analysis system 122, the data for estimating the weight of the food waste. The data can include the nature of the food waste, the type of the container, the count of the containers and the fullness of the containers. After receiving the food waste data, the food waste analysis system 122 can perform the estimation based on the formulas shown above in Eqns. (1)-(4).

Figure 6:
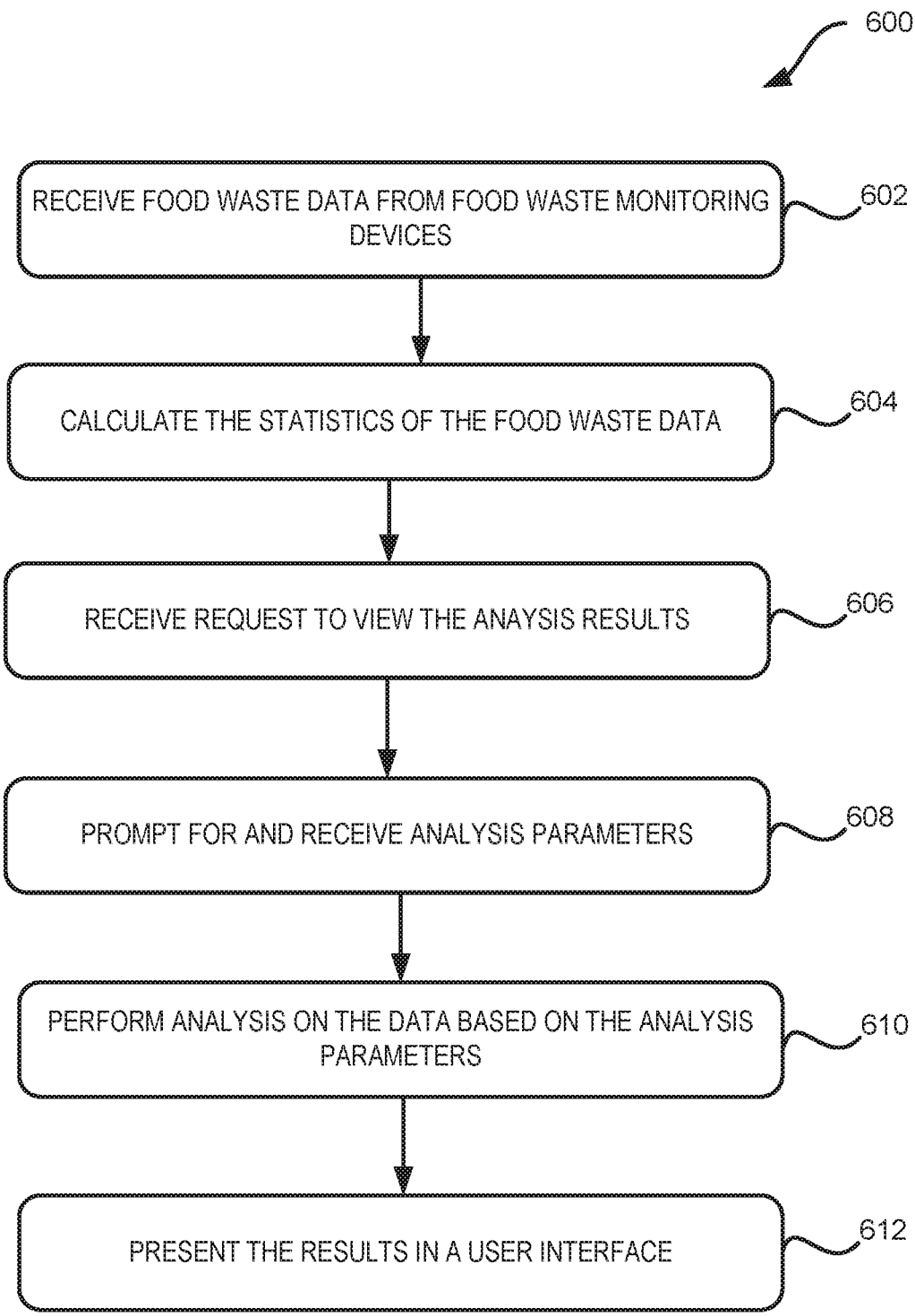
FIG. 6 is a flow diagram illustrating an example of a process for analyzing and presenting the food waste analysis results, according to certain aspects of the present disclosure.

FIG. 6 is a flow diagram illustrating an example of a process 600 for analyzing and presenting the food waste analysis results. For illustrative purposes, the process 600 is described with reference to implementations described above with respect to one or more examples described herein. Other implementations, however, are possible. In some aspects, the operations in FIG. 6 may be implemented in program code that is executed by one or more computing devices such as the food waste analysis device 112 depicted in FIG. 1. In some aspects of the present disclosure, one or more operations shown in FIG. 6 may be omitted or performed in a different order. Similarly, additional operations not shown in FIG. 6 may be performed.

At block 602, the process 600 involves receiving food waste data from various food waste monitoring devices 104. At block 604, the process 600 involves performing analysis on the food waste data by calculating statistics of the food waste data. At block 606, the process 600 involves receiving a request to review the analysis results from a user. At block 608, the process 600 involves presenting one or more user interfaces allowing the user to submit analysis parameters, such as selecting the food service location for which the analysis results are to be presented, specifying the time period for the analysis, or the format of the results to be presented. In another example, the results are automatically filtered based on the permissions associated with individual users who log into the system. Different users may have different levels of authority or different interests. For example, if a chef at University X logs into the food waste analysis system 122, the chef will only see the waste data and the analysis result for University X. In this case, the user does not need to specify the analysis parameters if the user is satisfied with presented data. In some implementations, the permissions of individual users are automatically assigned according to a hierarchy. The hierarchy may be associated with a food management system. An individual user's permissions may be based on their respective level in the hierarchy. At block 610, the process 600 involves filtering the food waste data by retrieving the food waste data that satisfy the analysis parameters and is permitted to be viewed by the user and performing the analysis on the retrieved data. At block 612, the process 600 involves presenting the analysis results in a user interface in a format specified by the user. For example, the user might specify to view the statistics of the different types of food waste. The user might also choose to view trends in the quantity of food waste over a certain period of time. These analysis results can provide useful insights to the user and help the user identify potential causes of food waste thereby facilitating actions to reduce the amount of food waste. It should be understood that any of the user interfaces disclosed herein may be presented in different languages. The user interfaces may be configured to allow a user to select a preferred language for presentation.

Figure 7:
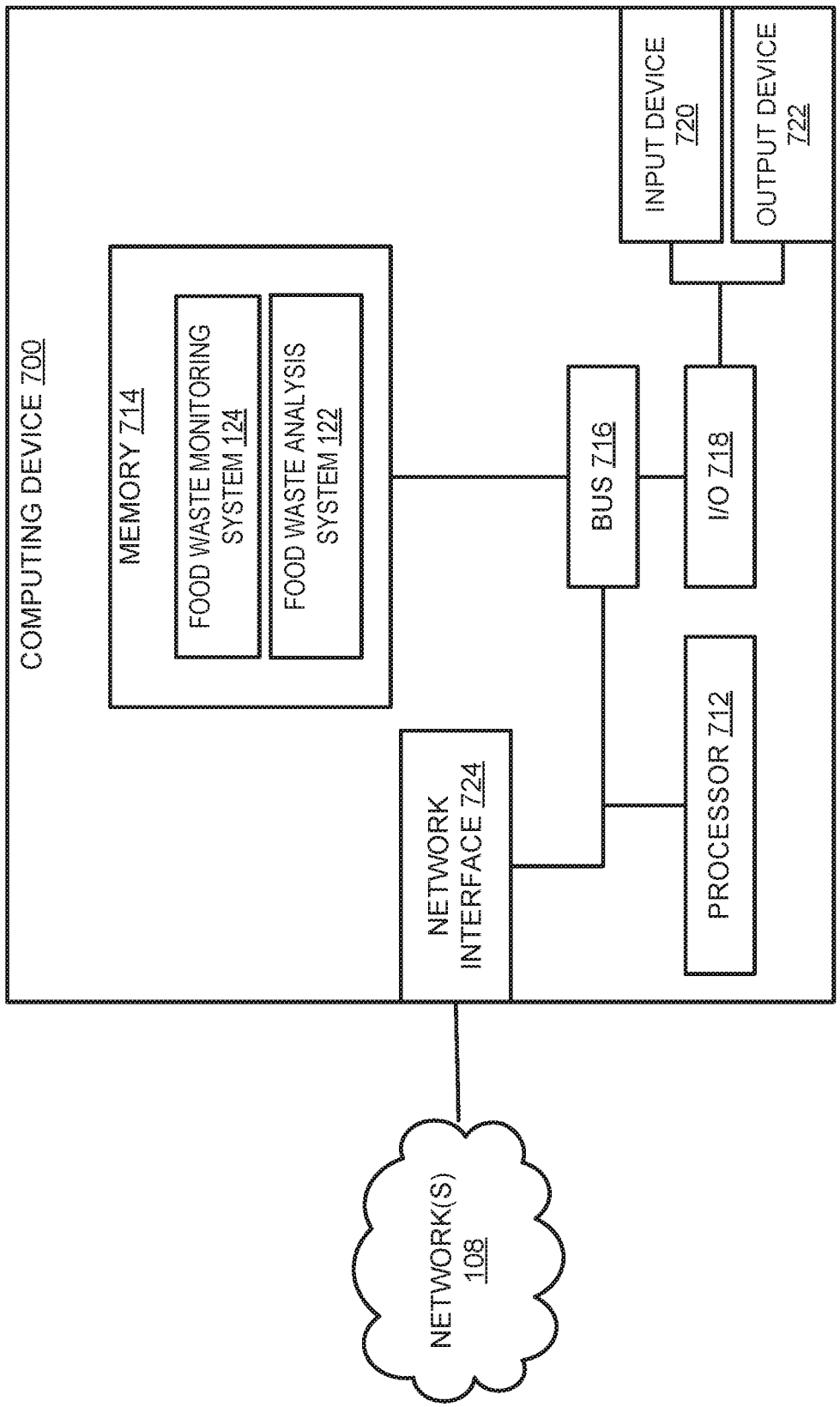
FIG. 7 is a block diagram depicting an example of a computing system suitable for implementing aspects of the techniques and technologies presented herein.

Any suitable computing system can be used for performing the operations described herein. For example, FIG. 7 depicts an example of a computing device 700 that can implement the food waste analysis device 112 or the food waste monitoring device 104 of FIG. 1. In some embodiments, the computing device 700 can include a processor 712 that is communicatively coupled to a memory 714 and that executes computer-executable program code and/or accesses information stored in the memory 714. The processor 712 may comprise a microprocessor, an application-specific integrated circuit ("ASIC"), a state machine, or other processing device. The processor 712 can include any of a number of processing devices, including one. Such a processor can include or may be in communication with a computer-readable medium storing instructions that, when executed by the processor 712, cause the processor to perform the operations described herein.

The memory 714 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 700 can also include a bus 716. The bus 716 can communicatively couple one or more components of the computing device 700. The computing device 700 can also include a number of external or internal devices such as input or output devices. For example, the computing device 700 is shown with an input/output ("I/O") interface 718 that can receive input from one or more input devices 720 or provide output to one or more output devices 722. The one or more input devices 720 and one or more output devices 722 can be communicatively coupled to the I/O interface 718. The communicative coupling can be implemented via any suitable manner (e.g., a connection via a printed circuit board, connection via a cable, communication via wireless transmissions, etc.). Non-limiting examples of input devices 720 include a touch screen (e.g., one or more cameras for imaging a touch area or pressure sensors for detecting pressure changes caused by a touch), a mouse, a keyboard, or any other device that can be used to generate input events in response to physical actions by a user of a computing device. Non-limiting examples of output devices 722 include an LCD screen, an external monitor, a speaker, or any other device that can be used to display or otherwise present outputs generated by a computing device.

The computing device 700 can execute program code that configures the processor 712 to perform one or more of the operations described above with respect to FIGS. 1-6. The program code can include the food waste monitoring system 124 or the food waste analysis system 122. The program code may be resident in the memory 714 or any suitable computer-readable medium and may be executed by the processor 712 or any other suitable processor.

The computing device 700 can also include at least one network interface device 724. The network interface device 724 can include any device or group of devices suitable for establishing a wired or wireless data connection to one or more data networks 108. Non-limiting examples of the network interface device 724 include an Ethernet network adapter, a modem, and/or the like. The computing device 700 can transmit messages as electronic or optical signals via the network interface device 724.

The foregoing description of the examples, including illustrated examples, of the invention has been presented only for the purposes of illustration and description and is not intended to be exhaustive or to limit the invention to the precise forms disclosed. Numerous modifications, adaptations, and uses thereof can be apparent to those skilled in the art without departing from the scope of this invention. The illustrative examples described above are given to introduce the reader to the general subject matter discussed here and are not intended to limit the scope of the disclosed concepts.

The invention claimed is:

1. A method for measuring food waste, comprising:
generating and presenting a first user interface displaying an image for each of a set of container types;
receiving a selection of a container type from the set of container types by receiving a selection from the first user interface;
generating and presenting a second user interface displaying the image for the selected container type;
receiving an indication of a fullness of a container in the selected container type by receiving an input from the second user interface;
modifying the image for the selected container type displayed in the second user interface based on the fullness of the container, wherein the modified image is displayed in the second user interface to show the fullness of the container;
receiving data indicating nature of food waste and a count of containers of the selected container type that were used to collect the food waste;
converting a volume of the food waste to a weight of the food waste based on a conversion factor selected based on the nature of the food waste, wherein the volume of the food waste is determined based on the selected container type, the fullness of the container, and the count of containers; and
transmitting food waste data to a remote computing device, wherein the food waste data comprises the weight of the food waste.

2. The method of claim 1, wherein the nature of the food waste comprises one of liquid waste, wet waste, mixed wet and dry waste or dry waste.

3. The method of claim 2, wherein converting the volume of the food waste to the weight of the food waste is performed by calculating $$W = (F \times (C \times N_Q)) \times N_C,$$

wherein W is the weight of the food waste, F is the fullness of the container, $N_C$ is the count of containers, $N_Q$ is the capacity of the container measured in a volume unit and C is a conversion factor selected based on the nature of the food waste.

4. The method of claim 1, further comprising:
receiving the volume of the food waste; and
converting the volume of the food waste to the weight of the food waste by $$W = Q_V \times C$$

wherein $Q_V$ is the quantity of food waste in volume measured in a volume unit and C is a conversion factor selected based on the nature of the food waste.

5. The method of claim 1, further comprising:
generating and presenting a first additional user interface configured to receive a reason for waste;
receiving an input indicating the reason for waste via the first additional user interface;
filtering, based on the input indicating the reason for waste, options for a destination of the food waste to be included in a second additional user interface configured to receive an indication of the destination of the food waste;
generating and presenting the second additional user interface including the filtered options;
receiving the indication of the destination of the food waste selected from the filtered options via the second additional user interface; and
transmitting the reason for waste and the destination of the food waste to the remote computing device in the food waste data.

6. The method of claim 5, further comprising:
generating and presenting a third user interface configured to display the food waste data; and
receiving, via the third user interface, confirmation about the food waste data, wherein transmitting the food waste data is performed after receiving the confirmation.

7. A system comprising:
a plurality of food waste monitoring devices, wherein each food waste monitoring device of the plurality of food waste monitoring devices is configured for:
generating and presenting a first user interface displaying an image for each of a set of container types;
receiving a selection of a container type from the set of container types by receiving a selection from the first user interface;
generating and presenting a second user interface displaying the image for the selected container type;

receiving an indication of a fullness of a container in the selected container type by receiving an input from the second user interface;

modifying the image for the selected container type displayed in the second user interface based on the fullness of the container, wherein the modified image is displayed in the second user interface to show the fullness of the container;

receiving data indicating nature of food waste and a count of containers of the selected container type that were used to collect the food waste;

converting a volume of the food waste to a weight of the food waste based on a conversion factor selected based on the nature of the food waste, wherein the volume of the food waste is determined based on the selected container type, the fullness of the container, and the count of containers; and transmitting food waste data to a food waste analysis device, wherein the food waste data comprises the weight of the food waste; and the food waste analysis device configured to communicate with the plurality of food waste monitoring devices and further configured for:

filtering the food waste data received from the plurality of food waste monitoring devices based on analysis parameters, wherein the analysis parameters comprise a data level selected from a hierarchy for calculating statistics of the food waste data;

calculating statistics for the filtered food waste data; and presenting the statistics for the filtered food waste data in an analysis result user interface.

8. The system of claim 7, wherein the nature of the food waste comprises one of liquid waste, wet waste, mixed wet and dry waste or dry waste.

9. The system of claim 8, wherein converting the volume of the food waste to the weight of the food waste is performed by calculating $$W=(F \times C \times N_Q) \times N_C,$$

wherein W is the weight of the food waste, F is the fullness of the container, $N_C$ is the count of containers, $N_Q$ is the capacity of the container measured in a volume unit and C is a conversion factor selected based on the nature of the food waste.

10. The system of claim 7, wherein each food waste monitoring device of the plurality of food waste monitoring devices is further configured for:

receiving the volume of the food waste; and converting the volume of the food waste to the weight of the food waste by $$W=Q_V \times C$$

wherein $Q_V$ is the quantity of food waste in volume measured in a volume unit and C is a conversion factor selected based on the nature of the food waste.

11. The system of claim 7, wherein each food waste monitoring device of the plurality of food waste monitoring devices is further configured for:

generating and presenting a first additional user interface configured to receive a reason for waste;

receiving an input indicating the reason for waste via the first additional user interface;

filtering, based on the input indicating the reason for waste, options for a destination of the food waste to be included in a second additional user interface configured to receive an indication of the destination of the food waste;

generating and presenting the second additional user interface including the filtered options;

receiving the indication of the destination of the food waste selected from the filtered options via the second additional user interface; and transmitting the reason for waste and the destination of the food waste to the food waste analysis device in the food waste data.

12. The system of claim 11, wherein each food waste monitoring device of the plurality of food waste monitoring devices is further configured for:

generating and presenting a third user interface configured to display the food waste data; and receiving, via the third user interface, confirmation about the food waste data, wherein transmitting the food waste data is performed after receiving the confirmation.

13. The system of claim 7, wherein the data level specifies a subset of the plurality of food waste monitoring devices and wherein filtering the food waste data received from the plurality of food waste monitoring devices comprises selecting food waste data received from the subset of food waste monitoring devices for analysis.

14. The system of claim 7, wherein the analysis parameters further comprise a date range for the food waste data.

15. The system of claim 7, wherein the plurality of food waste monitoring devices are deployed at different geographical locations and comprise at least one of a tablet, a smartphone, a laptop or a computer.

16. A non-transitory computer-readable medium having program code that is stored thereon, the program code executable by one or more processing devices for performing operations comprising:

generating and presenting a first user interface displaying an image for each of a set of container types;

receiving a selection of a container type from the set of container types by receiving a selection from the first user interface;

generating and presenting a second user interface displaying the image for the selected container type;

receiving an indication of a fullness of a container in the selected container type by receiving an input from the second user interface;

modifying the image for the selected container type displayed in the second user interface based on the fullness of the container, wherein the modified image is displayed in the second user interface to show the fullness of the container;

receiving data indicating nature of food waste and a count of containers of the selected container type that were used to collect the food waste;

converting a volume of the food waste to a weight of the food waste based on a conversion factor selected based on the nature of the food waste, wherein the volume of the food waste is determined based on the selected container type, the fullness of the container, and the count of containers; and transmitting food waste data to a remote computing device, wherein the food waste data comprises the weight of the food waste.

17. The non-transitory computer-readable medium of claim 16, wherein the nature of the food waste comprises one of liquid waste, wet waste, mixed wet and dry waste or dry waste.

18. The non-transitory computer-readable medium of claim 17, wherein converting the volume of the food waste to the weight of the food waste is performed by calculating $$W=(F \times C \times N_Q)) \times N_C,$$

wherein W is the weight of the food waste, F is the fullness of the container, $N_C$ is the count of containers, $N_Q$ is the capacity of the container measured in a volume unit and C is a conversion factor selected based on the nature of the food waste.

19. The non-transitory computer-readable medium of claim 16, wherein the operations further comprise:
receiving the volume of the food waste; and
converting the volume of the food waste to the weight of the food waste by $$W=Q_V \times C$$

wherein $Q_V$ is the quantity of food waste in volume measured in a volume unit and C is a conversion factor selected based on the nature of the food waste.

20. The non-transitory computer-readable medium of claim 16, wherein the operations further comprise:
generating and presenting a first additional user interface configured to receive a reason for waste;
receiving an input indicating the reason for waste via the first additional user interface;
filtering, based on the input indicating the reason for waste, options for a destination of the food waste to be included in a second additional user interface configured to receive an indication of the destination of the food waste;
generating and presenting the second additional user interface including the filtered options;
receiving the indication of the destination of the food waste selected from the filtered options via the second additional user interface; and
transmitting the reason for waste and the destination of the food waste to the remote computing device in the food waste data.

* * * * *